United States Patent
Jacobs et al.

(10) Patent No.: US 10,705,211 B2
(45) Date of Patent: Jul. 7, 2020

(54) OPTICAL SENSOR ARRANGEMENT

(71) Applicant: ams AG, Unterpremstaetten (AT)

(72) Inventors: Dan Jacobs, McKinney, TX (US);
Bernhard Greimel-Längauer,
Hofstaetten An Der Raab (AT)

(73) Assignee: ams AG, Unterpremstaetten (AT)

( * ) Notice: Subject to any disclaimer, the term of this patent is extended or adjusted under 35 U.S.C. 154(b) by 0 days.

(21) Appl. No.: 16/069,158

(22) PCT Filed: Jan. 12, 2017

(86) PCT No.: PCT/EP2017/050571
§ 371 (c)(1),
(2) Date: Jul. 10, 2018

(87) PCT Pub. No.: WO2017/121805
PCT Pub. Date: Jul. 20, 2017

(65) Prior Publication Data
US 2019/0018136 A1  Jan. 17, 2019

Related U.S. Application Data

(60) Provisional application No. 62/277,869, filed on Jan. 12, 2016.

(30) Foreign Application Priority Data

Mar. 2, 2016 (EP) ..................................... 16158274

(51) Int. Cl.
*G01S 17/02* (2020.01)
*G01S 17/08* (2006.01)
(Continued)

(52) U.S. Cl.
CPC ............ *G01S 17/04* (2020.01); *G01S 7/4813* (2013.01); *G01S 7/4868* (2013.01); *G01S 17/08* (2013.01); *G01S 17/87* (2013.01)

(58) Field of Classification Search
CPC ........ G01S 17/026; G01S 17/87; G01S 17/08; G01S 7/4868; G01S 7/4813
(Continued)

(56) References Cited

U.S. PATENT DOCUMENTS

| 6,965,327 B2* | 11/2005 | Reime | .................. H03K 17/941 340/555 |
| 7,486,386 B1* | 2/2009 | Holcombe | ............... G01C 3/08 356/4.01 |

(Continued)

FOREIGN PATENT DOCUMENTS

WO    2016/010481 A1    1/2016

*Primary Examiner* — Seung C Sohn
(74) *Attorney, Agent, or Firm* — Fish & Richardson P.C.

(57) ABSTRACT

An optical proximity sensor arrangement comprises a first sensor unit with a first emitter and a first detector and a second sensor unit with a second emitter and/or a second detector. The first detector is configured to detect light being emitted by the first emitter and, if applicable, by the second emitter, and being at least partially reflected. If applicable, the second detector is configured to detect light being emitted by the first emitter and being at least partially reflected. A distance between the first emitter and the first detector is, if applicable, less than a distance between the first detector and the second emitter and, if applicable, less than a distance between the first emitter and the second detector.

18 Claims, 2 Drawing Sheets

(51) Int. Cl.
  *G01S 17/04*    (2020.01)
  *G01S 7/481*    (2006.01)
  *G01S 7/486*    (2020.01)
  *G01S 17/87*    (2020.01)

(58) Field of Classification Search
  USPC .......................................................... 250/221
  See application file for complete search history.

(56) References Cited

U.S. PATENT DOCUMENTS

| | | | |
|---|---|---|---|
| 8,536,531 B2* | 9/2013 | Shih | G01S 17/026 |
| | | | 250/341.8 |
| 10,281,395 B2* | 5/2019 | Kim | G01N 15/06 |
| 10,327,710 B2* | 6/2019 | Ulrich | A61B 5/1495 |
| 2011/0180686 A1 | 7/2011 | Iwai | |
| 2011/0248151 A1 | 10/2011 | Holcombe et al. | |
| 2012/0298869 A1 | 11/2012 | Shih et al. | |
| 2013/0050677 A1 | 2/2013 | Kwong et al. | |
| 2015/0378013 A1 | 12/2015 | Bikumandla et al. | |

* cited by examiner

OPTICAL SENSOR ARRANGEMENT

The present invention relates to an optical sensor arrangement, e.g. an optical proximity sensor arrangement.

BACKGROUND OF THE INVENTION

Optical proximity sensors may be used in electronic devices such as for example smart phones. An optical proximity sensor may be implemented as active sensor arrangement being able to detect the presence of a nearby object without physical contact. An emitter may emit electromagnetic radiation, for example infrared radiation, and a detector may detect radiation returning after being reflected by an object.

Since the emitter and the detector may be positioned adjacent to each other and the radiation may have to pass through a cover, for example a cover glass or a cover plastic with ink printed on it, radiation may get reflected by the cover or ink, absorbed by the cover or ink, or scattered by the cover or ink and consequently be detected without having left the sensor arrangement and reached an object. This phenomenon is denoted as optical crosstalk and may lead to a reduced signal-to-noise ratio. A required or desired signal-to-noise ratio may thus impose limits on the intensity of the emitted radiation and/or the sensitivity of the detector to limit crosstalk. Consequently, a detection range, in particular a maximum detection distance, of the sensor arrangement may be reduced.

Optical crosstalk and a reduced detection range may be particularly problematic in arrangements where the ink layer covers the emitter and/or the detector to disguise them from an external observer.

SUMMARY OF THE INVENTION

According to the improved concept, at least two proximity sensing pairs are used, where one proximity sensing pair consists of an emitter and a detector arranged in close distance to each other and a further proximity sensing pair consists of an emitter and a detector arranged in farther distance to each other compared. The proximity sensing pair with emitter and detector arranged in close distance is formed by a first emitter and a first detector of a first sensor unit. It may be operated with a smaller light intensity and detector sensitivity and may be used for detecting objects within a closer distance to the sensor arrangement. The further proximity sensing pair with emitter and detector arranged in farther distance is formed by the first detector and a second emitter of a second sensor unit or by the first emitter and a second detector of the second sensor unit. It may be operated with a higher light intensity and detector sensitivity and may be used for detecting objects within a farther distance to the sensor arrangement. In this way, optical crosstalk is reduced for both proximity sensing pairs while a detection range of the sensor arrangement covers short as well as long distances.

Herein, the expression "light" is understood to comprise to visible light and infrared radiation if not stated otherwise. "Visible light" denotes electromagnetic radiation with a wavelength in a range between or approximately between $4*10^{-7}$ m and $7*10^{-7}$ m. "Infrared radiation", "infrared light" and "infrared" refer to electromagnetic radiation with a wavelength in a range between or approximately between $7*10^{-7}$ m and $1*10^{-3}$ m.

According to the improved concept, an optical proximity sensor arrangement, in particular an optical proximity sensor arrangement for detecting a presence of an object, comprising a first sensor unit and a second sensor unit is provided. According to an exemplary embodiment of the sensor arrangement, the first sensor unit comprises a first emitter, in particular a light emitting device, for example an infrared emitting device, and a first detector, in particular a light detector, for example an infrared detector. The first detector is configured to detect light, in particular infrared light, being emitted by the first emitter and being at least partially reflected, in particular by the object. The second sensor unit comprises a second emitter, in particular a light emitting device, for example an infrared emitting device, and/or a second detector, in particular a light detector, for example an infrared detector.

In implementations where the second sensor unit comprises the second emitter, the first detector is configured to detect light, in particular infrared light, being emitted by the second emitter and being at least partially reflected, in particular by the object. A distance between the first emitter and the first detector, in particular between an active area of the first emitter and an active area of the first detector, is less than a distance between the first detector and the second emitter, in particular between the active area of the first detector and an active area of the second emitter.

The first detector and the first emitter form a first proximity sensing pair with a first detection range. The first detection range is limited by a first minimum detection distance defined at least partially by the distance between the first emitter and the first detector. In particular, the first minimum detection distance is for example defined by an intersection of an emission cone of the first emitter and a detection cone of the first detector. Analogously, the first detector and the second emitter form a second proximity sensing pair with a second detection range. The second detection range is limited by a second minimum detection distance defined at least partially by the distance between the first detector and the second emitter. In particular, the second minimum detection distance is for example defined by an intersection of an emission cone of the second emitter and the detection cone of the first detector.

In implementations where the second sensor unit comprises the second detector, the second detector is configured to detect light, in particular infrared light, emitted by the first emitter and being at least partially reflected, in particular by the object. The distance between the first emitter and the first detector, in particular between the active area of the first emitter and the active area of the first detector, is less than a distance between the first emitter and the second detector, in particular between the active area of the first emitter and an active area of the second detector.

The first emitter and the second detector form a third proximity sensing pair with a third detection range. The third detection range is limited by a third minimum detection distance defined at least partially by the distance between the first emitter and the second detector. In particular, the third minimum detection distance is for example defined by an intersection of the emission cone of the first emitter and a detection cone of the second detector.

Since the distance between the first emitter and the first detector is less than the distance between the first detector and the second emitter, the first minimum detection distance is smaller than the second minimum detection distance. For the analog reason, the first minimum detection distance is smaller than the third minimum detection distance.

Therefore, the first proximity sensing pair may detect the object within a closer distance, for example down to zero distance, from the sensor arrangement than the second and/or the third proximity sensing pair. Also, the first proximity sensing pair may be driven with a lower intensity of the emitted light and/or a lower detection sensitivity of the first detector compared to the second and/or third proximity detection pair, which may reduce or limit optical crosstalk and thus increase a signal-to noise ratio.

Due to the greater distance between the first detector and the second emitter and/or between the first emitter and the second detector, however, the second and/or third proximity sensing pair may be driven with a higher intensity of the emitted light and/or a higher detection sensitivity of the first detector without increasing optical crosstalk to an inadmissible level. Consequently, a maximum detection distance or a detection range is greater for the second and/or the third proximity sensing pair than for the first proximity sensing pair.

Thus, by means of the improved concept a reduced minimum detection distance, an increased maximum detection distance as well as a reduced or limited optical crosstalk may be achieved at the same time. This holds irrespective of whether the second or the third proximity sensing pair or both of them are used in a respective implementation.

In implementations where the second sensor unit comprises the second emitter and the second detector, the second detector is configured to detect light emitted by the second emitter and being at least partially reflected, particular the object.

A distance between the second emitter and the second detector, in particular between the active area of the second emitter and the active area of the second detector, is less than the distance between the first detector and the second emitter, in particular between the active area of the first detector and the active area of the second emitter, and less than the distance between the first emitter and the second detector, in particular between the active area of the first emitter and the active area of the second detector.

The second detector and the second emitter form a fourth proximity sensing pair with a fourth detection range. The fourth detection range is limited by a fourth minimum detection distance defined at least partially by the distance between the second emitter and the second detector. In particular, the fourth minimum detection distance is defined by an intersection of an emission cone of the second emitter and a detection cone of the second detector. What was said above with respect to the first proximity sensing pair holds analogously for the fourth proximity sensing pair.

An emission cone generally includes all points in space that may be theoretically illuminated by the respective emitter. The emission cone is for example defined by a surface of the active area of the respective emitter and a maximum emission angle of the respective emitter. In particular, the emission cone is formed by all points that may be connected to the surface of the active area with a straight line including an angle smaller or equal to than the maximum emission angle with the normal to the active area. A detection cone generally includes all points in space, where light reaching the respective detector from these points may be theoretically detected by the respective detector. The detection cone is for example defined by a surface of the active area of the respective detector and a maximum detection angle of the respective detector. In particular, the detection cone is formed by all points that may be connected to the surface of the active area with a straight line including an angle smaller or equal to than the maximum emission angle with the normal to the active area.

The minimum and maximum detection distances as described above may for example be measured from the surface of the active area of the respective emitter and/or from the surface of the active area of the respective detector. The surfaces of the active areas of the detector and the emitter may for example lie within the same plane.

According to some implementations, the sensor arrangement further comprises a processing unit. The first detector is configured to generate a first detector signal depending on light being detected by the first detector. The processing unit is configured to receive the first detector signal and to determine a presence of the object within the first detection range and/or, if applicable, within the second detection range depending on the first detector signal.

In implementations comprising the second detector, the second detector is configured to generate a second detector signal depending on light being detected by the second detector.

The processing unit is configured to receive the second detector signal and to determine a presence of the object within the third detection range and/or, if applicable, within the fourth detection range depending on the second detector signal.

According to some implementations of the sensor arrangement, the processing unit is implemented as a processing unit of a portable electronic device, for example a smart phone or a tablet computer.

According to some implementations, the sensor arrangement further comprises a cover arrangement with a cover plate covering the first and the second sensor unit. A first surface, for example an inner surface, of the cover plate faces the first and the second sensor unit and a second surface, for example an outer surface, of the cover plate is located on a side of the cover plate opposite to the first surface.

According to some implementations of the sensor arrangement, the second surface lies at least partially within the first detection range of the first proximity sensing pair formed by the first emitter and the first detector.

In particular, the second surface lies within the first minimum detection distance. For example, the intersection of the emission cone of the first emitter and of the detection cone of the first detector lies at least partially on the first surface, between the first and the second surface and/or between the second surface and the first and the second sensor unit.

Consequently, the first proximity sensing pair may detect the object even if it lies very close to the sensor arrangement, in particular the cover arrangement, for example the cover plate, or even if the object touches the cover arrangement, for example the cover plate.

The surfaces of the active areas of the first emitter and the first detector may for example be arranged within a first principal plane. The first and the second surface of the cover plate are for example parallel to the first principal plane and a distance between the first principal plane and the second surface of the cover plate is for example equal to or greater than the first minimum detection distance.

According to some implementations of the sensor arrangement, the second sensor unit comprises the second emitter and the second surface of the cover plate lies outside of the second detection range of the second proximity sensing pair formed by the first detector and the second emitter.

According to some implementations of the sensor arrangement, the second sensor unit comprises the second detector and the second surface of the cover plate lies outside of the third detection range of the third proximity sensing pair formed by the second detector and the first emitter.

In particular, the second surface lies outside the second and/or the third minimum detection distance. For example, the intersection of the emission cone of the second emitter and of the detection cone of the first detector lies completely outside of the sensor arrangement. For example, the intersection of the emission cone of the first emitter and of the detection cone of the second detector lies completely outside of the sensor arrangement.

The relatively large distance between the first detector and the second emitter and/or between the first emitter and the second detector, respectively, leading to the corresponding relatively large minimum detection distances also imply a reduced amount of optical crosstalk of the second and/or the third proximity sensing pair.

The surface of the active area of the second emitter and/or the second detector may for example be arranged within the first principal plane. The distance between the first principal plane and the second surface of the cover plate is for example smaller than the second and/or the third minimum detection distance.

According to some implementations of the sensor arrangement, the second sensor unit comprises the second emitter and the second detector. The second surface of the cover plate lies at least partially within the fourth detection range of the fourth proximity sensing pair formed by the second emitter and the second detector. The explanations above with respect to the first proximity sensing pair and the first detection range hold analogously for the fourth proximity sensing pair and the fourth detection range, respectively.

According to some implementations of the sensor arrangement, the cover arrangement comprises a cover layer arranged on the first or on the second surface of the cover plate, wherein the cover layer is adapted to reflect visible light at least partially and/or to absorb visible light at least partially.

According to some implementations of the sensor arrangement, the cover layer is adapted to transmit at least partially light emitted by the first and/or, if applicable, the second emitter, in particular to transmit at least partially infrared light.

According to some implementations of the sensor arrangement, the cover layer comprises an ink layer or a paint layer.

According to some implementations of the sensor arrangement, the cover layer covers the first and the second sensor unit. The cover layer covers the first emitter and the first detector and covers the second emitter and/or the second detector. In particular, the cover layer does not comprise an aperture exposing or partially exposing the first or the second sensor unit. In particular, cover layer does not comprise an aperture through which the first emitter, the first detector, the second emitter or the second detector are visible from outside of the aperture arrangement.

The cover layer, in particular the ink or paint layer, may for example be white, black or have another color. In this way, the first and the second detector unit may be disguised from an external observer. On the other hand, the cover layer may imply an increased light scattering. However, according to the improved concept, in particular due to the combination of the first proximity sensing element with the second and/or the third proximity sensing element, a reduced signal-to-noise ratio due to increased scattering is for example avoided or inverted into an improved signal-to-noise ratio.

According to some implementations, the sensor arrangement further comprises at least one control unit, for example at least one state machine, configured to, during a first measurement cycle, drive the first emitter to cause the first emitter emitting light, in particular infrared light, with a first intensity and control a sensitivity of the first detector to a first sensitivity.

The first intensity and/or the first sensitivity are for example adapted to an amount of light scattering caused by the cover layer to avoid a reduced signal-to-noise and/or a saturation of the first detector for example due to optical crosstalk.

According to some implementations of the sensor arrangement, the second sensor unit comprises the second emitter and the at least one control unit is configured to, during a second measurement cycle, drive the second emitter to cause the second emitter emitting light, in particular infrared light, with a second intensity and control the sensitivity of the first detector to a second sensitivity. The second intensity is greater than the first intensity and/or the second sensitivity is greater than the first sensitivity.

As the distance between the second emitter and the first detector is greater than the distance between the first emitter and the first detector, the second intensity and the second sensitivity may be greater than the first intensity and sensitivity, respectively, without driving the first detector into saturation due to optical crosstalk. Thus, the second detection range of the second proximity sensing pair may be increased significantly because of low optical crosstalk and high signal-to-noise ratio.

According to some implementations of the arrangement, the processing unit is configured to determine a presence of the object in the first detection range depending on the first detector signal generated by the first detector during the first measurement cycle. The processing unit is configured to determine a presence of the object in the second detection range depending on the first detector signal generated by the first detector during the second measurement cycle.

According to some implementations of the sensor arrangement, the first sensor unit comprises a first integrated circuit, IC, comprising the first detector and comprising or being connected to the first emitter.

According to some implementations of the sensor arrangement, the at least one control unit comprises a state machine comprised by the first IC.

According to some implementations of the sensor arrangement, the second sensor unit comprises the second detector and the at least one control unit is configured to, during a third measurement cycle, drive the first emitter to cause the first emitter emitting light, in particular infrared light, with a third intensity and control a sensitivity of the second detector to a third sensitivity. The third intensity is greater than the first intensity and/or the third sensitivity is greater than the first sensitivity.

As explained above with respect to the first detector and the second emitter, the third detection range of the third proximity sensing pair may be increased significantly because of low optical crosstalk and high signal-to-noise ratio.

According to some implementations of the sensor arrangement, the processing unit is configured to determine a presence of the object in the third detection range depending on the second detector signal generated by the second detector during the third measurement cycle.

According to some implementations of the sensor arrangement, the second sensor unit comprises a second integrated circuit, IC, comprising the second detector. In implementations comprising the second emitter, the second IC may comprise or be connected to the second emitter.

According to some implementations of the sensor arrangement, the at least one control unit comprises a state machine comprised by the second IC.

According to some implementations of the sensor arrangement, the second sensor unit comprises the second emitter and the second detector and the at least one control unit is configured to, during a fourth measurement cycle, drive the second emitter to cause the second emitter emitting light, in particular infrared light, with a fourth intensity and control the sensitivity of the second detector to a fourth sensitivity.

The second detector is configured to detect light, in particular infrared light, being emitted by the second emitter and being at least partially reflected, in particular by the object.

According to some implementations, the second and/or the third intensity is greater than fourth intensity. According to some implementations, the second sensitivity and/or the third sensitivity is greater than the fourth sensitivity.

According to some implementations of the sensor arrangement, the processing unit is configured to determine a presence of the object in the fourth detection range depending on the second detector signal generated by the second detector during the fourth measurement cycle.

The fourth intensity and/or the fourth sensitivity are for example adapted to the amount of light scattering caused by the cover layer to avoid a saturation of the second detector for example due to optical crosstalk. In this way, the signal-to-noise ratio may be improved.

According to some implementations of the sensor arrangement, the at least one control unit comprises the state machine of the first IC and the state machine of the second IC. The state machines of the first and the second IC are for example synchronized with respect to a timing of light emission by the first and the second emitter, the control of the emitted light intensity and of the detector sensitivity.

According to some implementations, the sensor arrangement further comprises a light barrier element arranged between the first sensor unit and the second sensor unit.

According to some implementations of the sensor arrangement, the light barrier element is optically opaque at least for infrared light. The light barrier element is for example arranged to block direct light from the first sensor unit to the second sensor unit or vice versa.

In implementations comprising the second detector, the light barrier element may be arranged to block light being emitted by the first emitter that would otherwise reach the second detector directly or via reflections from the cover arrangement without leaving the sensor arrangement. In implementations comprising the second emitter, the light barrier element may be arranged to block light being emitted by the second emitter that would otherwise reach the first detector directly or via reflections from the cover arrangement without leaving the sensor arrangement.

By means of the light barrier element, optical crosstalk between the first and the second sensor unit may further be decreased and the signal-to-noise ratio of the sensor arrangement may consequently further be increased.

According to some implementations of the sensor arrangement, the first and/or the second emitter is implemented as a light emitting diode, LED, an infrared emitting diode, IRED or IRLED, a vertical-cavity surface-emitting laser, VCSEL, in particular an infrared emitting VCSEL or a laser, in particular an infrared laser.

According to some implementations, the first and/or the second detector is implemented as a photodetector, a photodiode or a CCD sensor, in particular as an infrared sensitive photodetector, photodiode or CCD sensor.

According to the improved concept, also a method for optical proximity detection is provided. According to an exemplary embodiment, the method comprises detecting by means of a first detector of a first sensor unit during a first measurement cycle light, in particular infrared light, being emitted by a first emitter of the first sensor unit and being at least partially reflected, in particular by an object.

The method further comprises detecting, by means of the first detector during a second measurement cycle light, in particular infrared light, being emitted by a second emitter of a second sensor unit and being at least partially reflected, in particular by the object, and/or detecting, by means of a second detector of the second detector unit during a third measurement cycle light being emitted by the first emitter and being at least partially reflected, in particular by the object.

A distance between the first emitter and the first detector is less than a distance between the first detector and the second emitter and/or less than a distance between the first emitter and the second detector.

According to some implementations of the method, during the first measurement cycle the light being emitted by the first emitter has a first intensity and a sensitivity of the first detector is controlled to a first sensitivity.

According to some implementations of the method, during the second measurement cycle the light being emitted by the second emitter has a second intensity and the sensitivity of the first detector is controlled to a second sensitivity, wherein the second intensity is greater than the first intensity and/or the second sensitivity is greater than the first sensitivity.

According to some implementations of the method, during the third measurement cycle light being emitted by the first emitter has a third intensity and the sensitivity of the second detector is controlled to a third sensitivity, wherein the third sensitivity is greater than the first sensitivity and/or the third sensitivity is greater than the first sensitivity.

According to some implementations, the method further comprises detecting by means of the second detector during a fourth measurement cycle light being emitted by the second emitter and being at least partially reflected.

According to some implementations of the method, during the fourth measurement cycle the light being emitted by the second emitter has a fourth intensity and a sensitivity of the second detector is controlled to a fourth sensitivity.

Further implementations of the method are readily derived from the various implementations of the optical proximity sensor arrangement and vice versa.

It is pointed out that the nomenclature of the first, second, third and fourth measurement cycle does not necessarily imply an ordering. In particular, any order or sequence of the first, the second, the third and the fourth measurement cycle or a subset of said measurement cycles may be used in various implementations of the sensor arrangement and the method according to the improved concept.

Furthermore, it is highlighted that the nomenclature of the first, second, third and fourth proximity sensing pairs does not imply the existence of proximity sensing pairs with a lower number. In particular, some implementations of the sensor arrangement may comprise the first proximity sensing pair and the third proximity sensing pair but not second proximity sensing pair.

In the following, the improved concept is explained in detail with the aid of exemplary implementations by reference to the drawings. Components that are functionally identical or have an identical effect may be denoted by identical references. Identical components and/or components with identical effects may be described only with respect to the figure where they occur first. Their description is not necessarily repeated in subsequent figures.

DETAILED DESCRIPTION

Figure 1:
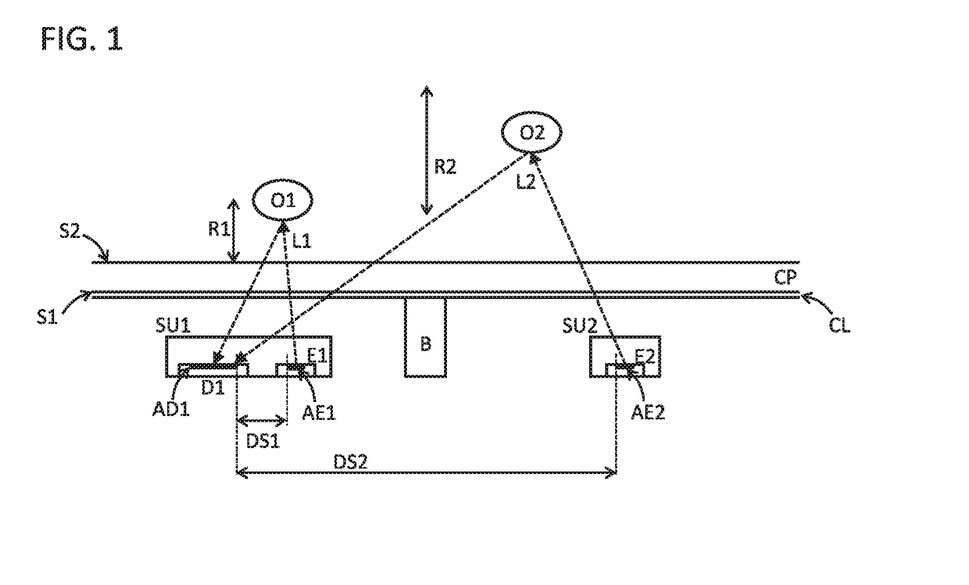
FIG. 1 shows a cross-section through an exemplary implementation of an optical proximity sensor arrangement according to the improved concept.

FIG. 1 shows a cross-section through an exemplary implementation of an optical proximity sensor arrangement according to the improved concept. The sensor arrangement comprises a first sensor unit SU1 comprising a first emitter E1, for example implemented as an infrared emitting LED, with an active area AE1 and a first detector D1, for example implemented as an infrared sensitive photodiode, with an active area AD1. A distance between the first emitter active area AE1 and the first detector active area AD1 is given by a first distance DS1. The first distance DS1 may for example lie in the order of several millimeters, for example 1 to 5 mm, for example 2 to 3 mm.

The sensor arrangement further comprises a second sensor unit SU2 comprising a second emitter E2, for example implemented as an infrared emitting LED, with an active area AE2. A distance between the first detector active area AD1 and the second emitter active area AE2 is given by a second distance DS2 being greater than the first distance DS1. For example, the second distance DS2 may lie in the order of several centimeters, for example 1 to 5 cm, for example 2 to 3 cm.

The sensor arrangement may for example further comprise an optional light barrier element B arranged between the first and the second sensor unit SU1, SU2.

The sensor arrangement for example further comprises a cover arrangement covering the first and the second sensor unit SU1, SU2 with a cover plate CP having a first surface S1 facing the sensor units SU1, SU2 and a second surface S2 opposite to the first surface S1. The cover plate CP is for example translucent or transparent for light being emitted by the first or the second emitter E1, E2. The cover plate may be translucent or transparent for infrared and visible light.

The cover arrangement may further comprise a cover layer CL, for example an ink or paint layer, for example a black, white or colored ink or paint layer, arranged on the first surface S1 of the cover plate CP and covering the sensor units SU1, SU2. Light emitted by the first or the second emitter E1, E2, in particular infrared light, may at least partially be transmitted by the cover layer CL, while visible light, in particular from outside the sensor arrangement, is at least partially reflected or at least partially absorbed by the cover layer CL.

Furthermore, FIG. 1 shows a first object O1 and a second object O2 being located close to the sensor arrangement and being not comprised by the sensor arrangement. The first and the second object O1, O2 may for example be different objects or may represent the same object at different times.

The optical proximity sensor arrangement may for example be comprised by a portable electronic device such as a smart phone or a tablet computer. In particular, the cover plate CP may correspond to or be a part, for example a bezel, of a display, in particular a display glass or plastic, of the portable electronic device.

The first emitter E1 and the first detector D1 form for example a first proximity sensing pair with a first detection range R1 as shown in FIG. 1. During a first measurement cycle, the first emitter E1 may emit light L1, for example a pulse of light, for example infrared light, which may at least partially exit the sensor arrangement through the cover arrangement and may hit the first object O1 being located within the first detection range R1. The light L1 is then for example partially reflected by the first object O1 and may reach the first detector active area AD1 through the cover arrangement. Consequently, the first detector D1 may detect the partially reflected light L1 and generate a first detector signal depending on the detected light.

A processing unit (not shown) is for example comprised by the portable electronic device or by the sensor arrangement and is for example connected to the first detector D1. The processing unit is for example configured to determine a presence of the first object O1 within the first detection range R1 depending on the first detector signal during the first measurement cycle.

It is pointed out that the presence of the first object O1 can only be determined in the described way if the first object O1 is located within the first detection range R1 of the first proximity sensing pair. The first detection range R1 is defined by a first minimum detection distance indicated by the head of the arrow R1 pointing to the cover plate CP and a first maximum detection distance indicated by the head of the arrow R1 pointing away from the cover plate CP.

The first minimum detection distance is for example defined by an intersection of an emission cone of the first emitter E1 and a detection cone of the first detector D1. If an object is located farther away from the first detector and emitter active areas AD1, AE1 than said intersection, the respective object cannot be illuminated by the light L1 emitted by the first emitter E1 and/or the reflected light L1 cannot be detected by the first detector D1. Since the emission and detection cones of the first emitter and detector E1, D1, respectively, may be specified, the first minimum detection distance is for example defined by the first distance DS1. In particular, the smaller the first distance DS1, the smaller is the first minimum detection distance and vice versa. In the example of FIG. 1, the first distance DS1 may be adapted such that the first minimum detection distance coincides or approximately coincides with a location of the second surface S2 of the cover plate CP. Consequently, objects having zero distance or essentially zero distance from the cover plate CP may be detected by the first proximity sensing pair.

The first maximum detection distance is for example defined by a first intensity of the light L1 being emitted by the first emitter E1 during the first measurement cycle and/or by a first sensitivity of the first detector D1 during the first measurement cycle. The higher the first intensity and the higher the first sensitivity, the greater is the first maximum detection distance.

However, the first intensity and/or the first sensitivity may not be chosen arbitrarily large, since optical crosstalk between the first detector and emitter D1, E1 may increase with increasing intensity and sensitivity. The optical crosstalk between the first detector and emitter D1, E1 may for example originate from light emitted by the first emitter and being partially reflected or scattered from the cover layer CL, the first surface S1 and/or the second surface S2 of the cover plate CP and reaching the first detector active area AD1 without leaving the sensor arrangement.

The second emitter E2 and the first detector D1 form for example a second proximity sensing pair with a first detection range R2 as shown in FIG. 1. During a second measurement cycle, which may for example follow or precede the first measurement cycle, the second emitter E2 may emit light L2, for example a pulse of light, for example infrared light, which may at least partially exit the sensor arrangement through the cover arrangement and may hit the second object O2 being located within the second detection range R2. The light L2 is then for example partially reflected by the second object O2 and may reach the first detector active area AD1 through the cover arrangement. Consequently, the first detector D1 may detect the partially reflected light L2 and generate the first detector signal depending on the detected light.

The processing unit is for example configured to determine a presence of the second object O2 within the second detection range R2 depending on the first detector signal during the second measurement cycle.

In analogy to the explanations above, the presence of the second object O2 can only be determined by the second proximity sensing pair if it is located within the second detection range R2. The second detection range R2 is defined by a second minimum detection distance indicated by the head of the arrow R2 pointing to the cover plate CP and a second maximum detection distance indicated by the head of the arrow R2 pointing away from the cover plate CP.

The second minimum detection distance is for example defined by an intersection of an emission cone of the second emitter E2 and a detection cone of the first detector D1 analogously as described above for the first sensing pair. The second minimum detection distance is consequently for example defined by the second distance DS2. In the example of FIG. 1, the second minimum detection distance may lie above the second surface S2 of the cover plate CP, in particular from a point of view of the sensor units SU1, SU2.

The second maximum detection distance is for example defined by a second intensity of the light L2 being emitted by the second emitter E2 during the second measurement cycle and/or by a second sensitivity of the first detector D1 during the second measurement cycle. The higher the second intensity and the higher the second sensitivity, the greater is the second maximum detection distance.

Since the second distance DS2 is greater, in particular significantly greater, than the first distance DS1, optical crosstalk between the first detector D1 and the second emitter E1 may be significantly reduced. In particular, an amount of optical crosstalk may for example decay with a squared distance between the respective emitter and detector. Thus, the second intensity and/or the second sensitivity may be chosen larger than the first intensity and/or sensitivity, respectively, without leading to an inadmissible amount of crosstalk. Thus, the second maximum detection distance may be larger than the first maximum detection distance.

For example, the first maximum detection distance may lie below 5 cm, for example at approximately 3 cm, while the second maximum detection distance may for example lie between 5 cm and 10 cm, for example at approximately 8 cm. Of course, these values may be adapted corresponding to a specific implementations of the sensor arrangement.

Due to the combination of the first proximity sensing pair with the first detection range R1 and the second proximity sensing pair with the second detection range R2, a total detection range of the optical proximity sensor arrangement extending for example from the second surface S2 of the cover plate CP to a relatively large distance defined by the second maximum detection distance may be achieved. Since the first intensity and/or sensitivity may be chosen relatively low, optical crosstalk of the first proximity sensing pair may be reduced. On the other hand, due to the larger second distance DS2, optical crosstalk of the second proximity sensing pair may be reduced as well. Consequently, a signal-to-noise ratio of the proximity sensor arrangement may be improved.

The optical proximity sensor arrangement of FIG. 1 may further comprise a control unit (not shown) for controlling a timing of the first and the second measurement cycle, in particular for controlling the first and the second intensities and the first and the second sensitivities as well as the respective timings. The control unit may for example be comprised by a first photodetector integrated circuit, IC, of the first detector D1. The first photodetector IC may also comprise the first detector active area AD1.

In particular, the control unit is for example configured to drive the first emitter E1 during the first measurement cycle to emit the light L1 with the first intensity and to drive the second emitter during the second measurement cycle to emit the light L2 with the second intensity. Further, the control unit is for example configured to control the sensitivity of the first detector D1 to the first sensitivity during the first measurement cycle and to the second sensitivity during the second measurement cycle.

In some implementations, the first photodetector IC or the first sensor unit SU1 comprises a controllable first current source (not shown) controlled for example by the control unit and adapted to provide a driving current to the first emitter E1, in particular during the first measurement cycle.

In some implementations, the first current source may also be configured to provide a driving current to the second emitter E2, in particular during the second measurement cycle. Alternatively, the sensor arrangement, for example the second sensor unit SU2, may comprise a second current source configured to provide the driving current to the second emitter E2. The second current source may for example be controlled by the control unit or by a further control unit.

Figure 2:
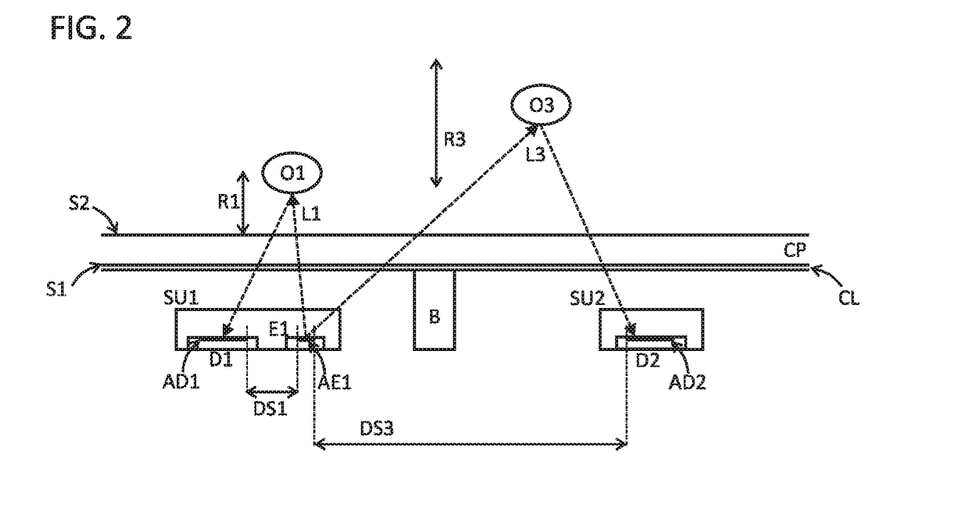
FIG. 2 shows a cross-section through a further exemplary implementation of an optical proximity sensor arrangement according to the improved concept.

FIG. 2 shows a cross-section through a further exemplary implementation of an optical proximity sensor arrangement according to the improved concept. The sensor arrangement comprises the first sensor unit SU1, the cover arrangement and for example the optional light barrier element B as described with respect to FIG. 1.

In FIG. 2, the sensor arrangement comprises a second sensor unit SU2 with a second detector D2, for example implemented as an infrared sensitive photodiode, with an active area AD2. A distance between the first emitter active area AE1 and the second detector active area AD2 is given by a third distance DS3 being greater than the first distance DS1. For example, the third distance DS3 may lie in the order of several centimeters, for example 1 to 5 cm, for example 2 to 3 cm.

Regarding the first proximity sensing pair and the explanations with respect to the first measurement cycle, it is referred to FIG. 1. The first emitter E1 and the second detector D2 form for example a third proximity sensing pair with a third detection range R§ as shown in FIG. 2. During a third measurement cycle, which may for example follow or precede the first measurement cycle, the first emitter E1 may emit light L3, for example a pulse of light, for example infrared light, which may at least partially exit the sensor arrangement through the cover arrangement and may hit a third object O3 being located within the third detection range R3. The light L3 is then for example partially reflected by the third object O3 and may reach the second detector active area AD2 through the cover arrangement. Consequently, the second detector D1 may detect the partially reflected light L3 and generate a second detector signal depending on the detected light.

The first and the third object O1, O3 may for example be different objects or may represent the same object at different times.

A processing unit (not shown) is for example comprised by the portable electronic device or by the sensor arrangement and is for example connected to the first and the second detector D1, D2. The processing unit is for example configured to determine the presence of the first object O1 within the first detection range R1 depending on the first detector signal during the first measurement cycle and/or to determine a presence of the third object O3 within the third detection range R3 depending on the second detector signal during the third measurement cycle.

As explained with respect to the second proximity sensing pair in FIG. 1, the presence of the third object O3 can only be determined in the described way it is located within the third detection range R3 of the third proximity sensing pair. The third detection range R3 is defined by a third minimum detection distance indicated by the head of the arrow R3 pointing to the cover plate CP and a third maximum detection distance indicated by the head of the arrow R3 pointing away from the cover plate CP.

The third minimum detection distance is for example defined by an intersection of the emission cone of the first emitter E1 and a detection cone of the second detector D2 analogously as described above for the second sensing pair. The third minimum detection distance is consequently for example defined by the third distance DS3. In the example of FIG. 2, the second minimum detection distance may lie above the second surface S2 of the cover plate CP, in particular from a point of view of the sensor units SU1, SU2.

In analogy to the explanations above with respect to the second maximum detection distance, the third maximum detection distance is for example defined by a third intensity of the light L3 being emitted by the first emitter E1 during the third measurement cycle and/or by a third sensitivity of the second detector D2 during the third measurement cycle. The higher the third intensity and the third the second sensitivity, the greater is the third maximum detection distance.

As explained above for the second proximity sensing pair, optical crosstalk between the first emitter E1 and the second detector D2 is for example reduced due to the third distance DS2 being relatively large, in particular being greater than the first distance DS1. Thus, the third intensity and/or the third sensitivity may be chosen larger than the first intensity and/or sensitivity, respectively, without leading to an inadmissible amount of optical crosstalk.

For example, the third maximum detection distance may be equal or approximately equal to the second maximum detection distance.

As explained for the combination of the first and the second proximity sensing pair with respect to FIG. 1, also the combination shown in FIG. 2 of the first proximity sensing pair with the first detection range R1 and the third proximity sensing pair with the third detection range R3 allows for a total detection range extending for example from the second surface S2 of the cover plate CP to a relatively large distance defined by the third maximum detection distance with reduced optical crosstalk and improved signal-to-noise ratio.

The optical proximity sensor arrangement of FIG. 2 may further comprise a control unit (not shown) for controlling a timing of the first and the third measurement cycle, in particular for controlling the first and the third intensities and the first and the third sensitivities and the respective timings. The control unit may for example be comprised by a second photodetector IC of the second detector D2. The second photodetector IC may also comprise the second detector active area AD2.

In particular, the control unit is for example configured to drive the first emitter E1 during the third measurement cycle to emit the light L3 with the third intensity. Further, the control unit is for example configured to control the sensitivities of the first detector D1 to the first sensitivity during the first measurement cycle and the sensitivity of the second detector D2 to the third sensitivity during the third measurement cycle.

In some implementations, the second photodetector IC or the second sensor unit SU2 further comprises a controllable second current source (not shown) controlled for example by the control unit and adapted to provide a driving current to the first emitter E1, in particular during the first and the third measurement cycle.

In some implementations according to FIG. 2, the first intensity is equal to the second intensity. In such implementations, the first and the second measurement cycles may be replaced by a common measurement cycle. All steps described above with respect to the first and the second measurement cycle may be performed during the common measurement cycle. In particular, the detection of the first object O1 by means of the first proximity sensing pair and of the third object O3 by means of the third proximity sensing pair may be performed in parallel using the same pulses of light being emitted by the first emitter E1.

Typically, a power consumption of a detector such as a photodiode may be smaller than a power consumption of an emitter such as an LED. Thus, an additional advantage of the arrangement shown in FIG. 2 may be a reduced power consumption.

Figure 3:
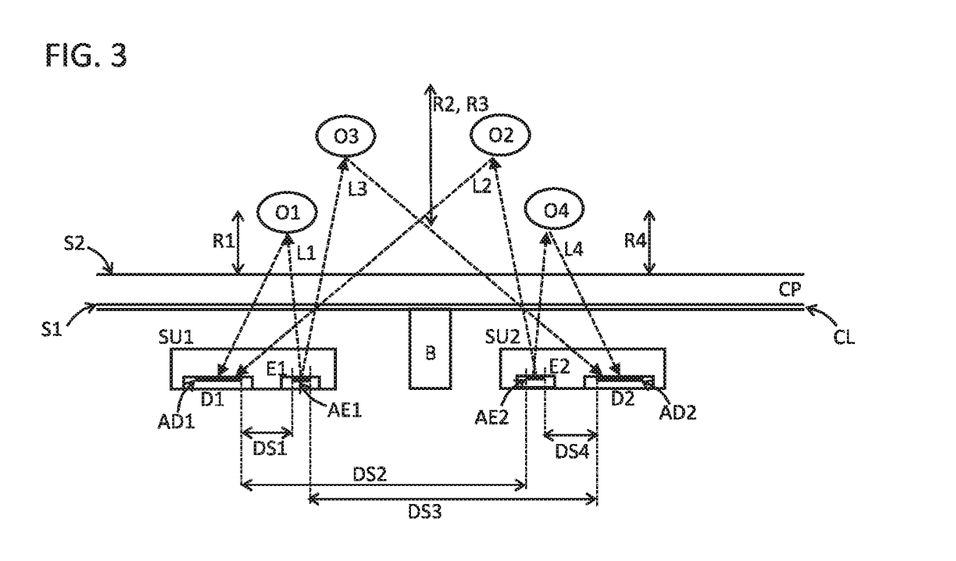
FIG. 3 shows a cross-section through a further exemplary implementation of an optical proximity sensor arrangement according to the improved concept.

FIG. 3 shows a cross-section through a further exemplary implementation of an optical proximity sensor arrangement according to the improved concept. The sensor arrangement comprises the first sensor unit SU1, the cover arrangement and for example the optional light barrier element B as described with respect to FIGS. 1 and 2.

In FIG. 3, the sensor arrangement comprises a second sensor unit SU2 with the second emitter E2 and the second detector D2. A distance between the second emitter active area AE2 and the second detector active area AD2 is given by a fourth distance DS4. The fourth distance DS2 may for example lie in the order of several millimeters, for example 1 to 5 mm, for example 2 to 3 mm. For the second and the third distance DS2, DS3, it is referred to the explanations with respect to FIGS. 1 and 2.

The sensor arrangement of FIG. 3 is in a sense a combination of the sensor arrangements shown in FIGS. 1 and FIGS. 2. In particular, the sensor arrangement of FIG. 3 comprises the first, the second and the third proximity sensing pair as described with respect to FIGS. 1 and 2.

For the detection of the presence of the first, the second and the third object O1, O2, O3 during the first, the second and the third measurement cycles, respectively, it is referred to the explanations of FIGS. 1 and FIGS. 2.

Furthermore, the second emitter E2 and the second detector D2 form for example a fourth proximity sensing pair with a fourth detection range R4 as shown in FIG. 4. During a fourth measurement cycle, the second emitter E2 may emit light L4, which may at least partially exit the sensor arrangement through the cover arrangement and may hit a fourth object O4 being located within the fourth detection range R4. The light L4 is then for example partially reflected by the fourth object O4 and may reach the second detector active area AD2 through the cover arrangement. Consequently, the second detector D2 may detect the partially reflected light L4 and generate the second detector signal depending on the detected light.

The first, second, third and fourth objects O1, O2, O3, O4 may for example all be different objects or may represent all the same object at different times. Alternatively, two or three of the first, second, third and fourth objects O1, O2, O3, O4 may represent the same object at different times while the remaining of the first, second, third and fourth objects O1, O2, O3, O4 represent the same object at different times.

A processing unit (not shown) is for example comprised by the portable electronic device or by the sensor arrangement and is for example connected to the first and the second detector D1, D2. The processing unit is for example configured to determine the presence of the first object O1 within the first detection range R1 depending on the first detector signal during the first measurement cycle and a presence of the second object O2 within the second detection range R2 depending on the second detector signal during the second measurement cycle. Further, the processing unit is for example configured to determine the presence of the third object O3 within the third detection range R3 depending on the second detector signal during the third measurement cycle and a presence of the fourth object O4 within the fourth detection range R4 depending on the second detector signal during the fourth measurement cycle.

It is pointed out that the first, the second, the third and the fourth measurement cycle may be performed in any order.

Regarding the fourth detection range R4, it is referred to the explanations regarding to the first detection range R1 with respect to FIG. 1. In particular, in the example of FIG. 4, the fourth distance DS4 may be adapted such that the fourth minimum detection distance coincides or approximately coincides with a location of the second surface S2 of the cover plate CP. Consequently, objects having zero distance or essentially zero distance from the cover plate CP may be detected by the fourth proximity sensing pair.

The optical proximity sensor arrangement of FIG. 3 may further comprise at least one control unit (not shown) for controlling a timing of the first, the second, the third and the fourth measurement cycle, in particular for controlling the first, the second, third and the fourth intensities and sensitivities and the respective timings. A first control unit of the at least one control unit may for example be comprised by the first photodetector IC or the first sensor unit SU1 and a second control unit of the at least one control unit may for example be comprised by the second photodetector IC or the second sensor unit SU2. The first and the second control unit are for example synchronized for controlling the timing of said measurement cycles.

The first control unit is for example configured to drive the first emitter E1 according to the first and the third measurement cycle and to control the sensitivity of the first detector D1 according to the first and the second measurement cycle, as explained above. The second control unit is for example configured to drive the second emitter E2 according to the second and the fourth measurement cycle and to control the sensitivity of the second detector D2 according to the third and the fourth measurement cycle, as explained above. In alternative implementations, the first control unit may take over the tasks of the second control unit or vice versa.

It is pointed out that the detection ranges R1, R2, R3, R4 referred to above correspond to respective normal detection ranges. That is, they correspond to detection ranges in a direction normal to the surfaces of the respective active emitter and detector areas AE1, AE2, AD1, AD2 and normal to the first and second surfaces S1, S2 of the cover plate CP.

In alternative implementations according to FIG. 4, some of the mentioned measurement cycles are optional. For example, some implementations may operate according to the first, the second and the third measurement cycles as described omitting the fourth measurement cycle. Other implementations may for example operate according to the first, the second and the fourth measurement cycle omitting the third measurement cycle or may operate according to the first, the third and the fourth measurement cycle omitting the second measurement cycle.

Furthermore, the first, the second, the third and the fourth proximity sensing pairs may also have respective lateral detection ranges defined by their respective positions on a principal plane parallel to the surfaces of the active emitter and detector areas AE1, AE2, AD1, AD2.

The advantages described with respect to implementation shown in FIGS. 1 and 2 to hold analogously for the implementation of FIG. 3. A further advantage of the implementation shown in FIG. 3 may be an increased lateral detection range.

Furthermore, an optical proximity sensor arrangement according FIG. 4 may also be used for gesture detection, in particular for two-dimensional gesture detection. To this end, changes in position of an object normal to the surfaces of the active emitter and detector areas AE1, AE2, AD1, AD2 may be detected by means of a changing intensity of light detected by the and/or the second detector D1, D2. Changes in position of the object parallel to a virtual line connecting the first and the second detector active areas AD1, AD2 may be detected by changes in a ratio of the intensity of light detected by the first detector D1 to the intensity of light detected by the second detector D2.

By means of a sensor arrangement or a method according to the improved concept, optical proximity detection with increased detection range, in particular an increase maximum detection distance, may be achieved without increasing or with reducing overall optical crosstalk. Thus a signal-to-noise ratio the sensor arrangement may be improved. The improved concept is particularly advantageous if the sensor units SU1, SU2 are disguised behind the cover layer CL, which otherwise may impose restrictions on emitted light intensity and/or detector sensitivity due to optical crosstalk.

The invention claimed is:

1. An optical proximity sensor arrangement comprising:
   a first sensor unit comprising a first emitter and a first detector;
   a second sensor unit comprising a second emitter and a second detector,
   wherein the first detector and the first emitter are configured to operate as a first proximity sensing pair having a first distance range, wherein during operation as the first proximity sensing pair, the first detector is configured to detect light emitted by the first emitter and at least partially reflected from an object within the first distance range, wherein the first detector and the second emitter are configured to operate as a second proximity sensing pair having a second distance range, wherein during operation as the second proximity sensing pair, the first detector is configured to detect light emitted by the second emitter and at least partially reflected from an object within the second distance range, wherein the second detector and the first emitter are configured to operate as a third proximity sensing pair having a third distance range, wherein during operation as the third proximity sensing pair, the second detector is configured to detect light emitted by the first emitter and at least partially reflected from an object within the third distance range, wherein the second detector and the second emitter are configured to operate as a fourth proximity sensing pair having a fourth distance range, wherein during operation as the fourth proximity sensing pair, the second detector is configured to detect light emitted by the second emitter and at least partially reflected from an object within the fourth distance range, wherein a distance between the first emitter and the first detector is less than a distance between the first detector and the second emitter, wherein the distance between the first emitter and the first detector is less than a distance between the first emitter and the second detector, and wherein the distance between the first emitter and the first detector is less than a distance between the second emitter and the second detector.

2. The optical proximity sensor arrangement according to claim 1, wherein the first and/or the second detector is implemented as a photodiode, or as an infrared sensitive photodiode.

3. The optical proximity sensor arrangement according to claim 1, further comprising a cover arrangement with a cover plate covering the first and the second sensor unit, wherein
   a first surface of the cover plate faces the first and the second sensor unit; and
   a second surface of the cover plate opposite to the first surface lies at least partially within a first distance range.

4. The optical proximity sensor arrangement according to claim 3, wherein the first range has a minimum distance of zero.

5. The optical proximity sensor arrangement according to claim 3, wherein
   the second surface of the cover plate lies outside of the second distance range; and/or
   the second surface of the cover plate lies outside of the third distance range.

6. The optical proximity sensor arrangement according to claim 5, wherein the second distance range has a minimum distance greater than zero.

7. The optical proximity sensor arrangement according to claim 3, wherein
   the second surface of the cover plate lies at least partially within the fourth distance range.

8. The optical proximity sensor arrangement according to claim 3, wherein the cover arrangement comprises a cover layer arranged on the first or on the second surface of the cover plate, wherein the cover layer is adapted to reflect visible light at least partially and/or to absorb visible light at least partially.

9. The optical proximity sensor arrangement according to claim 8, wherein the cover layer comprises an ink layer or a paint layer.

10. The optical sensor arrangement according to claim 1, further comprising at least one control unit configured to, during a first measurement cycle, drive the first emitter to cause the first emitter to emit light with a first intensity and control a sensitivity of the first detector to a first sensitivity.

11. The optical sensor arrangement according to claim 10, wherein the at least one control unit is configured to, during a second measurement cycle, drive the second emitter to cause the second emitter to emit light with a second intensity and control the sensitivity of the first detector to a second sensitivity, wherein the second intensity is greater than the first intensity and/or the second sensitivity is greater than the first sensitivity.

12. The optical sensor arrangement according to claim 10, wherein the at least one control unit is configured to, during a third measurement cycle, drive the first emitter to cause the first emitter to emit light with a third intensity and control a sensitivity of the second detector to a third sensitivity, wherein the third intensity is greater than the first intensity and/or the third sensitivity is greater than the first sensitivity.

13. The optical sensor arrangement according to claim 10, wherein the at least one control unit is configured to, during a fourth measurement cycle, drive the second emitter to cause the second emitter to emit light with a fourth intensity and control the sensitivity of the second detector to a fourth sensitivity.

14. The optical proximity sensor arrangement according to claim 1, further comprising a light barrier element arranged between the first sensor unit and the second sensor unit.

15. A method for optical proximity detection comprising
    detecting, a first detector of a first sensor unit during a first measurement cycle, light being emitted by a first emitter of the first sensor unit and being at least partially reflected; and
    detecting, by the first detector of the first sensor unit during a second measurement cycle, light being emitted by a second emitter of a second sensor unit and being at least partially reflected;
    detecting, by a second detector of the second sensor unit during a third measurement cycle, light being emitted by the first emitter of the first sensor unit and being at least partially reflected; and
    detecting, by the second detector of the second sensor unit during a fourth measurement cycle, light being emitted by the second emitter of the second sensor unit and being at least partially reflected,
    wherein a distance between the first emitter and the first detector is less than a distance between the first detector and the second emitter,
    wherein the distance between the first emitter and the first detector is less than a distance between the first emitter and the second detector, and
    wherein the distance between the first emitter and the first detector is less than a distance between the second emitter and the second detector.

16. The method according to claim 15, wherein during the first measurement cycle the light being emitted by the first emitter has a first intensity and a sensitivity of the first detector is controlled to a first sensitivity, and
    wherein;

during the second measurement cycle the light being emitted by the second emitter has a second intensity and the sensitivity of the first detector is controlled to a second sensitivity, wherein the second intensity is greater than the first intensity and/or the second sensitivity is greater than the first sensitivity; and/or during the third measurement cycle the light being emitted by the first emitter has a third intensity and the sensitivity of the second detector is controlled to a third sensitivity, wherein the third intensity is greater than the first intensity and/or the third sensitivity is greater than the first sensitivity.

17. The method according to claim 15, wherein during the fourth measurement cycle the light being emitted by the second emitter has a fourth intensity and a sensitivity of the second detector is controlled to a fourth sensitivity.

18. An optical proximity sensor arrangement comprising a first sensor unit;
a second sensor unit; and
at least one control unit,
wherein the first sensor unit comprises a first emitter and a first detector configured to detect light being emitted by the first emitter and being at least partially reflected, wherein the second sensor unit comprises:

a second emitter, wherein the first detector is configured to detect light being emitted by the second emitter and being at least partially reflected, and wherein a distance between the first emitter and the first detector is less than a distance between the first detector and the second emitter, a second detector, wherein the second detector is configured to detect light being emitted by the first emitter and being at least partially reflected, wherein the distance between the first emitter and the first detector is less than a distance between the first emitter and the second detector, wherein the at least one control unit is configured, during a first measurement cycle, to drive the first emitter to cause the first emitter to emit light with a first intensity and control a sensitivity of the first detector to a first sensitivity, and wherein the at least one control unit is configured, during a second measurement cycle, to drive the second emitter to cause the second emitter to emit light with a second intensity and control the sensitivity of the first detector to a second sensitivity, wherein the second intensity is greater than the first intensity and the second sensitivity is greater than the first sensitivity.

* * * * *

UNITED STATES PATENT AND TRADEMARK OFFICE
CERTIFICATE OF CORRECTION

PATENT NO. : 10,705,211 B2
APPLICATION NO. : 16/069158
DATED : July 7, 2020
INVENTOR(S) : Jacobs et al.

It is certified that error appears in the above-identified patent and that said Letters Patent is hereby corrected as shown below:

In the Claims

Column 18
Claim 15, Line 38, after "detecting," insert -- by --.
Claim 15, Line 41, after "reflected;" delete "and".
Claim 16, Line 67, delete "wherein;" and insert -- wherein: --.

Signed and Sealed this
Eighth Day of September, 2020

Andrei Iancu
*Director of the United States Patent and Trademark Office*